(12) United States Patent
Torres et al.

(10) Patent No.: US 7,656,055 B2
(45) Date of Patent: Feb. 2, 2010

(54) HYDRO-WIND POWER GENERATING TURBINE SYSTEM AND RETROFITTING METHOD

(76) Inventors: Rosalia Torres, P.O. Box 800, Gainesville, VA (US) 20156; E. Robert Perry, P.O. Box 800, Gainesville, VA (US) 20156

( * ) Notice: Subject to any disclaimer, the term of this patent is extended or adjusted under 35 U.S.C. 154(b) by 399 days.

(21) Appl. No.: 11/786,507

(22) Filed: Apr. 12, 2007

(65) Prior Publication Data

US 2009/0230688 A1    Sep. 17, 2009

(51) Int. Cl.
*F03B 9/00* (2006.01)
*H02P 9/04* (2006.01)
(52) U.S. Cl. .............................. 290/55; 290/44; 60/398
(58) Field of Classification Search ................... 290/43, 290/44, 54, 55; 60/398
See application file for complete search history.

(56) References Cited

U.S. PATENT DOCUMENTS

| | | | | |
|---|---|---|---|---|
| 3,952,723 A * | 4/1976 | Browning | ................... | 126/247 |
| 4,149,092 A | 4/1979 | Cros | | |
| 4,372,732 A * | 2/1983 | Browning | ................... | 416/14 |
| 4,503,673 A | 3/1985 | Schachle et al. | | |
| 7,183,664 B2 * | 2/2007 | McClintic | ................... | 290/55 |
| 7,418,820 B2 * | 9/2008 | Harvey et al. | ................. | 60/487 |
| 7,484,363 B2 * | 2/2009 | Reidy et al. | ................... | 60/398 |
| 2006/0210406 A1 | 9/2006 | Harvey et al. | | |

* cited by examiner

*Primary Examiner*—Nicholas Ponomarenko

(57) ABSTRACT

An electrical power producing wind turbine eliminates the possibility of being struck by lightning, reduces the complexity of gear trains and simplifies maintenance at heights. The wind turbine is electrically isolated from ground to reduce the possibility of being struck by lightning and the generator is located at ground level to simplify maintenance. The turbine blade shaft is directly attached to a hydraulic pump. The hydraulic fluid is transmitted to ground level through dielectric tubing and acts both as an electrical isolating medium and a transmitter of mechanical energy to the generator located at ground level. The wind turbine blade, shaft and hydraulic pump are electrically isolated from the support structure at the upper end.

12 Claims, 2 Drawing Sheets

HYDRO-WIND POWER GENERATING TURBINE SYSTEM AND RETROFITTING METHOD

FIELD OF THE INVENTION

The present invention relates to wind turbines, and more particularly to a wind turbine having a hydraulic transmission and an associated method for retrofitting standard wind turbine systems.

BACKGROUND OF THE INVENTION

Electrical power producing wind turbines are a supplement to power generating stations using fossil fuels or nuclear fuel to produce electricity. The primary components of current wind turbines are blades, blade shafts, a gear train and a generator. The gear train increases the speed of rotation of the shaft to run the generator at higher speeds of rotation than the turbine blades are rotating. The gear train and the generator combine to weigh more than twenty tons in many modern wind turbine implementations. A sample gear train is shown at 60 in FIG. 1, with the blade shaft 61 being coupled with a larger gear 62, which can then interact with appropriately sized intermediate gears 63 and a generator shaft gear 64 to drive the generator shaft 65.

Current wind turbines locate the primary system components at the upper end of the support structure, sometimes exceeding 300 feet in the air. Putting all of the mechanical equipment at great height creates installation and maintenance problems, especially in inclement weather. In many areas, cranes cannot service the wind turbine during the winter months. Additionally, wind turbine support systems must be designed to handle the extreme weight at such high altitudes.

A nacelle is normally provided to house the gear train and generator at blade shaft level, adding to the wind resistance at the top of the structure and as an attraction for lightning since it is solidly grounded to the supporting tower. Having the generator at height subjects it to lightning strikes that can severely damage the generator and the electrical connections to ground level. Both the tower and the generator electrical conductors act as a direct high conductance path for lightning to ground potential.

The wind turbine blades, being at an elevated height in relationship to surrounding structures, become much like a lightning rod and attract any potential lightning strikes in the area. Lightning damage to the wind turbine blades are expensive to repair and in many instances can cause damage to the supporting tower due to the imbalance caused by the damaged blade as it rotates. Cost of the blades is magnified by the insertion of electrically conductive cables and/or metal screening in an attempt to direct the lightning current directly to the support tower without the current traveling over or through the blade external material.

SUMMARY OF THE INVENTION

The present invention provides, in part, a novel method of transmitting power to a wind turbine generator that effectively isolates the generator from lightning strikes. A hydraulic pump is directly connected to the wind turbine shaft. The output of the pump is directed to ground level through high-pressure dielectric tubing. At ground level, the hydraulic fluid is directed to a hydraulic motor that requires a reduced volume of oil per revolution compared to the pump located on the wind turbine shaft. The variation in volume of oil per revolution between the pump and motor acts similarly to a gear train in a traditional wind turbine. For example, if the volume of oil expelled per revolution at the pump is twice that required for one revolution of the hydraulic motor at the ground level, than the ground level motor will have twice the revolutions per minute as the pump. This is desirable, as the more revolutions per minute the hydraulic motor can rotate the generator, the greater the reduction in the size of the generator for an equivalent power output. The limitation is the torque required of the motor to rotate the generator.

In one aspect, the present invention electrically isolates the hydraulic pump and the wind turbine shaft from the metal support tower. The electrical isolation can be accomplished in several ways. The upper part of the present metal support tower can have the upper end supplemented by a dielectric material such as fiberglass, polymer ceramic, or commercially available porcelain insulators. A cast material (such as the polymer ceramic) can be utilized to act as both an isolating dielectric material and formed to provide a support platform for the pump and turbine shaft as well as a weather enclosure for the pump. This material can be used instead of metal, in part, due to the lighter weight support requirements of the design of the present invention.

Using hydraulics as an intermediary between the wind turbine shaft and the generator has several advantages. An unloading valve can be placed between the pressure and return hydraulic lines at ground level, to allow the turbine blades to start rotating at a lower wind speed. As the inertia of the blades is overcome by the wind, the unloading valve can be closed, causing the hydraulic oil to flow through the pump and rotate the generator. This can provide start-up of the generator at lower wind speeds, producing more kilowatt-hours.

The wind turbine blade speed of rotation can be controlled with a variable control valve partially blocking the high-pressure line from the hydraulic pump, or, it can act as a brake for the blades by completely closing the high-pressure line. To prevent impacting the generator at start-up when the blades are already turning, a small accumulator can be inserted in the high-pressure line. The accumulator can also be used to provide power to overcome the generator inertia at start-up by allowing the accumulated high-pressure oil stored in the accumulator to actuate the hydraulic motor for a short period of time. This helps in overcoming the initial start-up rotation of the generator.

The use of hydraulics provides a novel system requiring a minimum of maintenance that is all conducted at ground level. It is not necessary for a person to be transmitted to a great height to conduct maintenance, as approximately 90% of the required equipment is at ground level. In the event of problems with the equipment required to amplify the rotation of the blades to drive the generator, only one piece of equipment is located at height and does not require external lubrication or periodic maintenance.

In the event of a pump failure, the pump is of sufficient low weight that it can be easily lowered to the ground without the need for large and expensive cranes. Most large mobile cranes are not available for wind farm maintenance during the winter months, in most states, as the cranes are too big and constitute a dangerous situation on commercial roads that might be icy.

Without the upper portion of the wind turbine in electrical contact with the ground, it is less likely the blades will be struck by lightning, reducing maintenance and structural damage. The cost of the blades will also be reduced, as there will be no need for internal metal conductors to prevent lightning from burning holes in the blades.

Another embodiment of our invention involves the use of all metal aluminum blades. When the blades are electrically connected to the ground, the blades will attract lightning strikes as the blades will be the highest structure in the vicinity and will attract lightning. However, with the top of the tower and the blades electrically isolated from ground, it will be much like a metal airplane flying though a thunder storm with little or no damage since the lightning current will run across the surface of the metal blade and dissipate into the air.

It is understood that there can be many variations on the system configuration, and these variations will still remain within the present invention.

MODE(S) FOR CARRYING OUT THE PRESENT INVENTION

Figure 2:
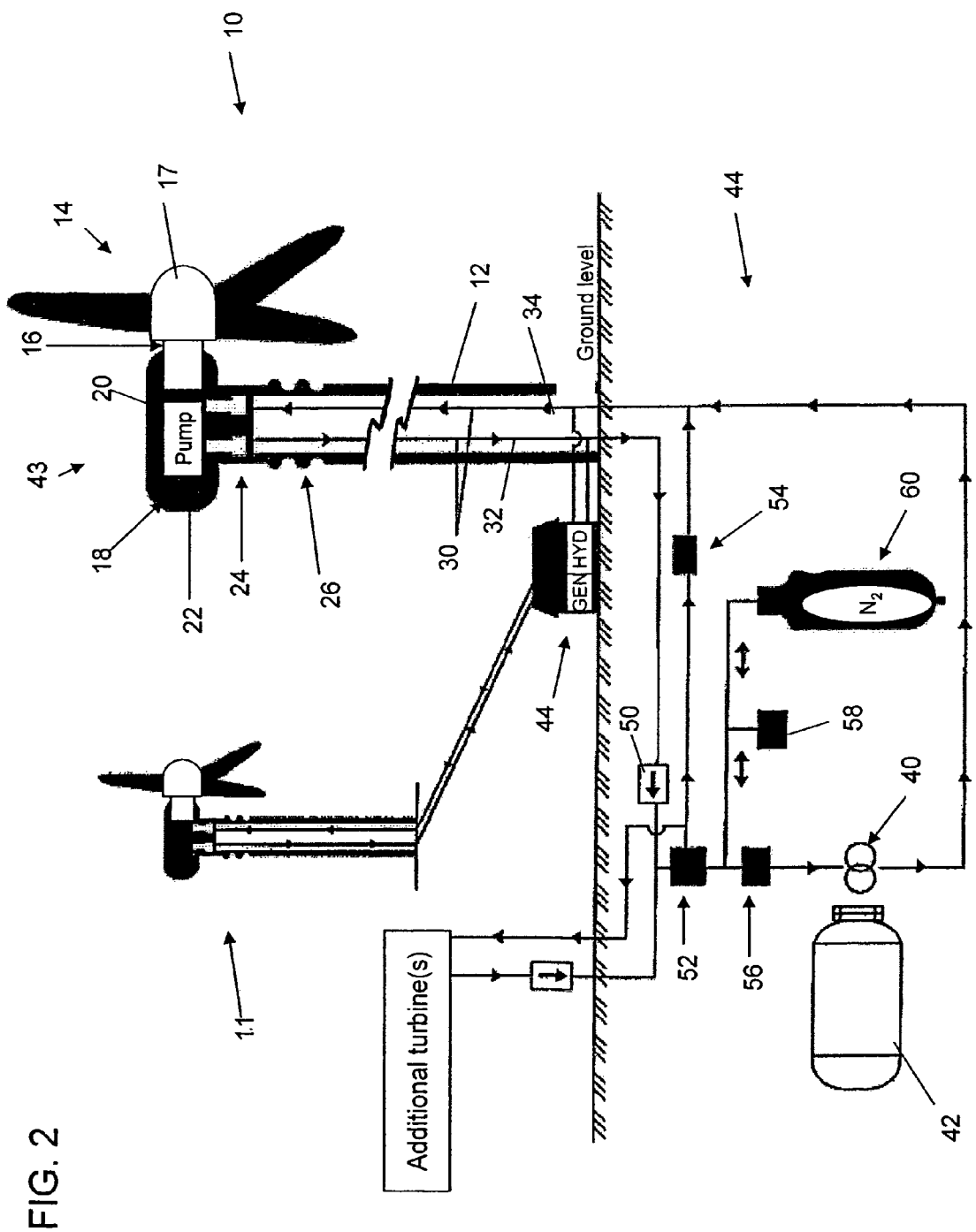
FIG. 2 is a sample schematic of one embodiment of the present invention.

As shown in FIG. 2, there is provided a wind turbine system 10 in accordance with one embodiment of the present invention. The system includes a tower 12 having a blade and/or propeller arrangement 14 including at least two and typically three blades mounted on a blade shaft 16 with a hub member 17, wherein the blade shaft is mechanically coupled to a hydraulic pump 20 maintained within nacelle 18. Hydraulic pump forms part of the hydraulic transmission system of the present invention. Hydraulic transmission system includes an above-ground transmission component 43 and a ground level transmission component 44, with above-ground transmission component including the pump 20 and reservoir 22 with an appropriate suction line between the two as is known in the art.

The pump 20 is a variable displacement pump, such as a radial piston pump, wobble plate pump, swash plate pump or a bent axis pump, for example, and the pump works in a rotary fashion, whereby it develops a partial vacuum on the inlet side, permitting fluid under atmospheric pressure in the reservoir to flow into the pump inlet. The pump then ejects this fluid at a pressure higher than atmospheric pressure down the high pressure line. As the load is placed on the fluid, the pressure at the outlet side of the pump increases to a value that is normally indicated as the pump maximum. In one embodiment of the present invention, a pump with a 5,000 psi pressure rating is employed, meaning that the unit can maintain flow against a load of 5,000 psi. The pump also preferably has a volumetric flow output of many times the hydraulic motor requirement per revolution. In one embodiment of the present invention, pumps such as those commercially available from Eaton Vickers of Eden Prairie, Minn. can be employed.

The reservoir holds excess hydraulic fluid (e.g., oil) to accommodate volume changes that occur, for example, due to cylinder or temperature driven expansion and contraction as well as from possible leaks. The reservoir also manages the separation of any excess air and can work as a heat accumulator depending upon possible losses in the system when peak power is used. In one embodiment of the present invention, the reservoir is provided with a hydraulic oil capacity of twenty gallons and can optionally be provided with an appropriately sized baffle dividing the tank into suction and return suction. The reservoir placed at an appropriate elevation so as to ensure proper flooded pump suction.

Swivel plates 24 are provided to allow the nacelle and hydraulic components to swivel depending upon wind conditions for optimal performance. In one embodiment of the invention, the swivel plates can be rotated by hydraulic yaw motors (not shown) that turn the nacelle so that the blades face into the wind (or out of the wind depending upon power management requirements). Support insulator 26 is also provided and connected to the upper part of the support tower 12 to minimize the potential for grounding the blades, blade shaft, nacelle and any other components supported by tower and thereby minimize the negative effects of lightning strikes on the wind turbine system. In one embodiment of the present invention, a dielectric material such as polymer ceramic, fiberglass or a commercially available porcelain insulator is used on the nacelle and as the support insulator. A cast material (such as the polymer ceramic) can be utilized to act as both an isolating dielectric material and formed to provide a support platform for the pump and turbine shaft as well as a weather enclosure for the pump.

Hydraulic lines 30 are provided depending from the pump lines within tower. A high pressure hydraulic line 32 is shown with the downward flow arrows and a low pressure line 34 is shown with the upward flow arrows in FIG. 2. In one embodiment of the present invention, the hydraulic lines comprise hoses of dielectric material or sheathing as exemplified above in connection with the support insulator.

As further shown in FIG. 2, a hydraulic motor 40 and coupled generator 42 are maintained at ground level in a ground hydraulic transmission component 44 established to assist the overall functioning and performance of the present invention. Ground hydraulic component 44 includes a one-way check valve 50 along high pressure line and a bypass valve 52 which normally allows fluid at no pressure to circulate from the pump 20 back up to the reservoir 22. The bypass valve 52 is placed between the pressure and return hydraulic lines at ground level, to allow the turbine blades to start rotating at a lower wind speed. Without such a bypass valve, the blades would not be able to begin rotating until sufficient pump pressure was created to overcome the generator inertia. As the inertia of the blades is overcome by the wind, the bypass valve can be closed, and the hydraulic oil with its stored energy can then be released from the accumulator to flow through the hydraulic motor (which is mechanically attached to the generator shaft), rotating the generator and overcoming the generator inertia. This can provide start-up of the generator at lower wind speeds, producing more kilowatt-hours.

The generator converts the mechanical energy from the wind rotating the shaft into electrical energy. While any known hydraulic motor and generator for use with wind turbines can be employed with the present invention, in one embodiment of the present invention, commercial motors, pumps and generators offered by Eaton Corporation of Cleveland, Ohio, Bosch Group of Stuttgart, Germany, and/or Parker Hannifin Corporation of Cleveland, Ohio can be employed.

A flow indicator 54, control valve 56, pressure switch 58 and accumulator 60 are also provided as part of ground hydraulic transmission component 44. The accumulator allows for storage of temporarily unneeded fluid delivered from the pump, and the check valve assists in allowing the accumulator to charge and maintain fluid pressure during down time, for example. The accumulator also helps prevent impacting of the generator at start-up when the blades are already turning, thereby acting as a shock absorber for the hydraulic circuit. The accumulator can also be used to provide power to overcome the generator inertia at start-up by allowing the accumulated high-pressure fluid stored in the accumulator to actuate the hydraulic motor for a short period of time. In one embodiment of the present invention, the accumulator includes a bladder containing pressurized nitrogen gas, as illustrated in FIG. 2. In one embodiment of the present invention, no accumulator is provided as part of the ground level hydraulic transmission component. In such an embodiment, a slip clutch can be employed between the blade shaft and the blades to reduce impacting of the generator, particularly if enough "give" in the hose is present to soften the impact.

When the flow indicator 54 shows a predetermined flow, a signal is sent by the flow indicator to the control valve 56 to open, thereby allowing high pressure fluid from the accumulator 60 to pass through the hydraulic motor 40 attached to the generator 42 and thereby bringing the generator up to speed, as described above. When pressure in the accumulator 60 drops to a predetermined level, the pressure switch 58 closes the bypass valve 52, thereby directing flow from the pump 20 to the hydraulic motor 40. In one embodiment of the present invention, part of the fluid directed from the pump can be directed to the accumulator at this stage in order to recharge it for the next time start-up is required. Overall, the present invention utilizes the flow indicator 54 and the pressure switch 58 to regulate the flow of hydraulic fluid by opening and/or closing bypass valve 52 and control valve 54.

Figure 1:
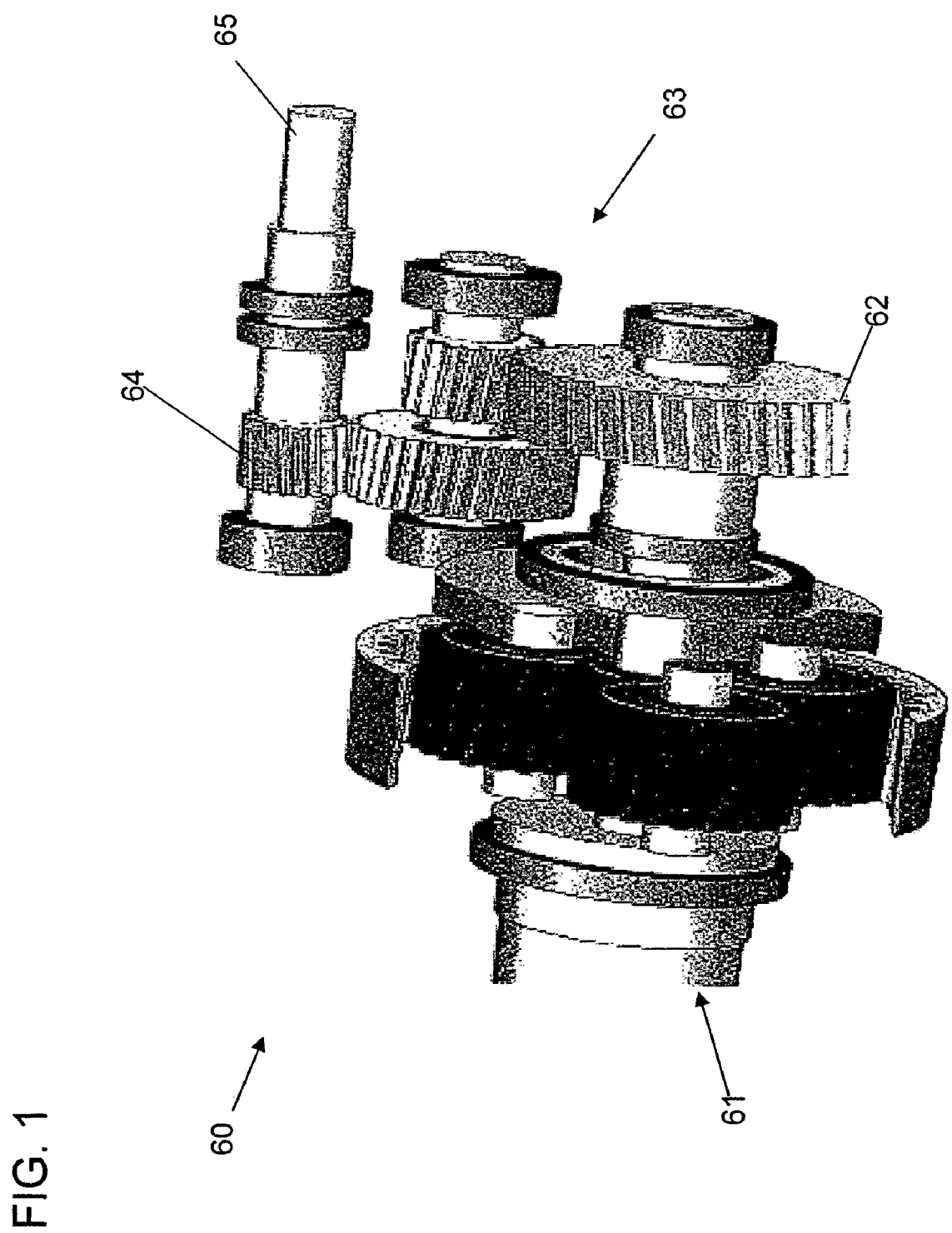
FIG. 1 is a perspective view of a mechanical gear transmission as known in connection with wind turbines.

The transmission of the present invention is arranged such that the hydraulic motor requires a reduced volume of fluid per revolution compared to the pump on the wind turbine shaft. As such, the hydraulic system acts as a transmission similar to a gear train 60 on standard wind turbines as shown in FIG. 1. For example, if the volume of oil expelled per revolution at the pump is twice that required for one revolution of the hydraulic motor at the ground level, then the ground level motor will have twice the revolutions per minute as the pump. This is desirable, as the more revolutions per minute the hydraulic motor can rotate the generator, the greater the reduction in the size of the generator for an equivalent power output.

Overspeed protections are also enabled by the present invention, and include both aerodynamic and physical braking systems as are known in the art. Further, cooling fins can be provided at the blade hub level for oil cooling.

In one embodiment of the present invention, the wind turbine blade speed of rotation can be controlled with a variable control valve partially blocking the high-pressure line from the hydraulic pump, or, it can act as a brake for the blades by completely closing the high-pressure line.

While not a requirement of the present invention, in one embodiment of the present invention, a second wind turbine 11 or a plurality of additional wind turbines of similar arrangement to that described can be provided as part of a wind farm in accordance with one aspect of the present invention. In such embodiment, the multiple wind turbines are combined to operate a single generator or multiple generators, with each turbine having similar if not identical hydraulic components and operating effectively as a single turbine driving a generator. Such an arrangement provides economy of generator size, with a greater diversity of power source and reliability of power, allowing larger generators than can be accommodated by the nacelle on top of the tower. A larger generator allows higher output voltages for direct connection to the utility power and makes synchronous generators practical. This eliminates the power electronics presently in use, i.e., a.c. low voltage to dc low voltage, to a.c. 60 Hz, then through a transformer to increase voltage to power lines of 15 kV in typical embodiments.

It will be appreciated that the power generated by the wind turbine(s) of the present invention through generator can be used to produce either electrical or mechanical power, as required by the particular application of the invention. It will further be appreciated that no electrical or electronic controls are required at the top of the tower, as all electrical connections to the ground from the top of the tower are eliminated. This results in less attraction to lightning strikes, which is a major and primary cause of wind turbine shutdown. Electrical cables in the blades for conducting lightning to the ground can also be eliminated. The blade pitch can be controlled automatically at the top of the tower, or from the ground with hydraulic pump oil pressure. The speed ratio can be controlled by the volume output differences between the hydraulic pump and the hydraulic motor driving the generator.

The system can be retrofitted to existing wind turbines with mechanical gear boxes as follows. First, the existing wind turbine can be identified based upon type and components positioned within the nacelle. If the existing wind turbine includes the traditional configuration with gearbox, high speed shaft, generator, control system components, cooling system components and mechanical braking components, all of these components can be removed from the nacelle, leaving the rotor shaft inside the body of the nacelle, and the rotor (blades and hub) outside the nacelle. Any electronic controls can also be removed. Depending upon the type of generator, it is possible to re-locate the generator at ground level so as to tie in with the hydraulic motor and system as described above. In any event, the above-ground hydraulic system components including the pump and reservoir can be positioned and secured within the nacelle, and appropriate pump inlet and outlet openings can be sized and provided in the nacelle base. Next, appropriate dielectric hoses can then be connected to the pump in the ordinary fashion, and mated with the openings so that appropriate pump functioning is preserved while the hoses then extend to the ground system components as described above. The remaining ground system components can then be connected to result in the closed loop hydraulic system described above.

With the majority of the wind turbine moving parts at ground level, i.e. generator, speed changer, and controls, there is less potential for system shutdown. The hydraulic pump is the only active device attached to the wind turbine shaft, it is relatively light and can be changed out by hoist equipment in all kinds of weather. In one embodiment of the present invention, the hydraulic system can employ commercially available components instead of custom developed components, thereby reducing development time. The lightness of the above-ground components of the hydraulic transmission also facilitate the use of different tower materials other than metal.

It should be understood that the foregoing description and examples are only illustrative of the present invention; the optimum dimensional relationships for the parts of the invention, including variations in size, materials, shape, form, function and the manner of operation, assembly and use, are deemed readily apparent to one skilled in the art, and all equivalent relationships to those illustrated in the drawings and described in the specification are intended to be encompassed by the present invention. Thus, various alternatives and modifications can be devised by those skilled in the art without departing from the invention. Accordingly, the present invention is intended to embrace all such alternatives, modifications, and variances that fall within the scope of the appended claims.

What is claimed and desired to be secured by Letters Patent is:

1. A power generating wind turbine, comprising:
a tower;
a propeller arrangement secured to the tower comprising a plurality of propellers, a propeller hub and a shaft;
an above-ground hydraulic transmission component cooperatively engaged with the shaft, comprising a pump and a reservoir; and
a ground level hydraulic transmission component cooperatively engaged with the above-ground hydraulic transmission component, said ground level component including a hydraulic motor and a generator secured at or near ground level whereby said generator is capable of being driven by the hydraulic motor, wherein the ground level hydraulic transmission component further includes an accumulator located at or near ground level and the accumulator can store pressurized fluid to enable the generator to achieve start up without using wind enemy from the propeller arrangement.

2. The turbine of claim 1, wherein an upper portion of the tower comprises a dielectric material that provides a support for the above-ground component and electrically isolates the pump and shaft from the tower.

3. The turbine of claim 1, further including a high pressure fluid line extending from the pump to the ground level component and a low pressure fluid return line extending from the ground level to the pump.

4. The turbine of claim 3 wherein the fluid lines comprise dielectric hoses or enclosures.

5. The turbine of claim 3 wherein the high pressure fluid line extends through a check valve and a bypass valve, and wherein the bypass valve can allow fluid at no pressure to circulate from the pump back to the reservoir.

6. The turbine of claim 3 wherein the high pressure fluid line extends from the bypass valve into the accumulator and separately through a control valve and into the hydraulic motor.

7. A method for providing wind power with low wind speed turbine blade initiation, comprising the steps of:
providing a tower;
providing a propeller arrangement secured to the tower comprising a plurality of propellers, a propeller hub and a shaft;
providing an above-ground hydraulic transmission component cooperatively engaged with the shaft, comprising a pump and a reservoir; and
providing a ground level hydraulic transmission component cooperatively engaged with the above-ground hydraulic transmission component, said ground level component including
a hydraulic motor and a generator secured at or near ground level whereby said generator is capable of being driven by the hydraulic motor, wherein the step of providing the ground level hydraulic transmission component includes providing an accumulator located at or near ground level and the accumulator can store pressurized fluid to enable the generator to achieve start up without using wind energy from the propeller arrangement.

8. The method of claim 7, wherein an upper portion of the tower comprises a dielectric material that provides a support for the above-ground component and electrically isolates the pump and shaft from the tower.

9. The method of claim 7 further including the step of providing a high pressure fluid line extending from the pump to the ground level component and a low pressure fluid return line extending from the ground level to the pump.

10. The method of claim 7 wherein the fluid lines comprise dielectric hoses.

11. The method of claim 7 wherein the high pressure fluid line extends through a check valve and a bypass valve, and wherein the bypass valve can allow fluid at no pressure to circulate from the pump back to the reservoir.

12. The method of claim 10 wherein the high pressure fluid line extends from the bypass valve into the accumulator and separately through a control valve and into the hydraulic motor.

* * * * *